(12) United States Patent
Wait

(10) Patent No.: US 9,429,925 B2
(45) Date of Patent: Aug. 30, 2016

(54) METHOD FOR OPERATING AN APPLIANCE AND A REFRIGERATOR APPLIANCE

(71) Applicant: General Electric Company, Schenectady, NY (US)

(72) Inventor: Keith Wesley Wait, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 376 days.

(21) Appl. No.: 14/155,407

(22) Filed: Jan. 15, 2014

(65) Prior Publication Data
US 2015/0198937 A1   Jul. 16, 2015

(51) Int. Cl.
| | |
|---|---|
| G05D 3/12 | (2006.01) |
| G05B 11/01 | (2006.01) |
| G05B 15/02 | (2006.01) |
| G05F 1/66 | (2006.01) |
| F25D 29/00 | (2006.01) |

(52) U.S. Cl.
CPC .............. *G05B 15/02* (2013.01); *F25D 29/00* (2013.01); *G05F 1/66* (2013.01); *F25B 2500/06* (2013.01); *F25D 2700/14* (2013.01); *G05B 2219/2642* (2013.01)

(58) Field of Classification Search
None
See application file for complete search history.

(56) References Cited

U.S. PATENT DOCUMENTS

| | | | | |
|---|---|---|---|---|
| 4,847,782 A * | 7/1989 | Brown, Jr. | .......... | H02J 13/0086 307/38 |
| 2002/0135495 A1 * | 9/2002 | Lei | .......... | H04B 3/54 340/870.11 |
| 2004/0061616 A1 * | 4/2004 | Fischer | .......... | G06F 1/30 340/657 |
| 2006/0255165 A1 | 11/2006 | Ha | | |
| 2006/0260335 A1 * | 11/2006 | Montuoro | .......... | F25B 49/02 62/236 |
| 2006/0276938 A1 * | 12/2006 | Miller | .......... | G06Q 50/06 700/295 |
| 2007/0239317 A1 * | 10/2007 | Bogolea | .......... | B60H 1/0065 700/276 |
| 2008/0272934 A1 * | 11/2008 | Wang | .......... | H02J 3/14 340/870.11 |
| 2009/0045680 A1 * | 2/2009 | Litch | .......... | F25D 17/065 307/66 |
| 2009/0243852 A1 * | 10/2009 | Haupt | .......... | G01W 1/00 340/541 |
| 2010/0289643 A1 * | 11/2010 | Trundle | .......... | F24F 11/0086 340/545.1 |

(Continued)

FOREIGN PATENT DOCUMENTS

| | | |
|---|---|---|
| JP | 2003056962 A | 2/2003 |
| WO | WO 2009/114906 | 9/2009 |
| WO | WO 2012016402 | 2/2012 |

*Primary Examiner* — Adam Lee
(74) *Attorney, Agent, or Firm* — Dority & Manning, P.A.

(57) ABSTRACT

A method for operating an appliance, such as a refrigerator appliance, is provided. The method includes establishing a location of the appliance, obtaining weather information associated with the location of the appliance, scheduling a predicted power loss event for the appliance based at least in part on the weather information from the step of receiving, and operating the appliance according to a power loss operating profile before or during the predicted power loss event. A related refrigerator appliance is also provided.

20 Claims, 4 Drawing Sheets

(56) References Cited

U.S. PATENT DOCUMENTS

| | | | | |
|---|---|---|---|---|
| 2010/0318306 A1* | 12/2010 | Tierney | G01D 4/002 | 702/62 |
| 2010/0328314 A1* | 12/2010 | Ellingham | G06Q 50/06 | 345/440 |
| 2011/0035059 A1* | 2/2011 | Ersavas | A01G 1/00 | 700/276 |
| 2011/0046792 A1* | 2/2011 | Imes | F24F 11/0086 | 700/278 |
| 2011/0202185 A1* | 8/2011 | Imes | H04L 43/08 | 700/277 |
| 2011/0231028 A1* | 9/2011 | Ozog | G06Q 10/06 | 700/291 |
| 2011/0270453 A1* | 11/2011 | Kalogridis | H02J 3/14 | 700/291 |
| 2012/0065788 A1* | 3/2012 | Harper, III | G06F 1/3206 | 700/291 |
| 2012/0083930 A1* | 4/2012 | Ilic | G06Q 30/06 | 700/287 |
| 2012/0096716 A1* | 4/2012 | Tran | F28D 20/023 | 29/897.3 |
| 2012/0154108 A1* | 6/2012 | Sugaya | G06F 9/4443 | 340/5.1 |
| 2012/0167093 A1* | 6/2012 | Shook | G06F 12/0802 | 718/100 |
| 2012/0259470 A1* | 10/2012 | Nijhawan | G05D 23/1934 | 700/278 |
| 2013/0018843 A1* | 1/2013 | Bultman | G06F 17/00 | 707/609 |
| 2013/0173079 A1* | 7/2013 | Taira | H04L 12/2829 | 700/296 |
| 2013/0174586 A1* | 7/2013 | Kang | F25D 29/00 | 62/56 |
| 2013/0261824 A1* | 10/2013 | Hazra | H02J 3/18 | 700/291 |
| 2013/0274945 A1* | 10/2013 | Ganu | H02J 3/14 | 700/296 |
| 2013/0343202 A1* | 12/2013 | Huseth | H04W 52/0206 | 370/244 |
| 2014/0039686 A1* | 2/2014 | Corbin | G05D 23/1917 | 700/276 |
| 2014/0049053 A1* | 2/2014 | Inoue | H02J 3/383 | 290/30 R |
| 2014/0149332 A1* | 5/2014 | Tanaka | G06N 5/02 | 706/46 |
| 2014/0277795 A1* | 9/2014 | Matsuoka | G06Q 50/06 | 700/291 |
| 2015/0142179 A1* | 5/2015 | Ito | F24F 11/006 | 700/276 |
| 2015/0186904 A1* | 7/2015 | Guha | G06Q 10/06316 | 705/7.26 |

* cited by examiner

METHOD FOR OPERATING AN APPLIANCE AND A REFRIGERATOR APPLIANCE

FIELD OF THE INVENTION

The present subject matter relates generally to methods for operating appliances, such as refrigerator appliances, in order to limit or prevent negative effects of electricity interruptions on the appliances.

BACKGROUND OF THE INVENTION

Appliances, such as refrigerator appliances, can require electricity to operate. Certain buildings having appliances therein are connected to electrical grids that supply electricity. The electrical grid can supply electricity reliably; however, severe weather can negatively affect the electrical grid. For example, high winds or rain can damage the electrical grid and interrupt the supply of electricity to the appliances.

Electricity interruptions can be problematic for appliance users. For example, a shelf life of food items within the refrigerator appliance is dependent upon the temperature of the refrigerator appliance's chilled chamber, and the refrigerator appliance cannot actively cool food items therein during electricity interruptions. Thus, without electricity, the temperature of the refrigerator appliance's chilled chamber rises and can negatively affect the shelf life of food items therein. In particular, food items within the refrigerator appliance can spoil or become inedible during electricity interruptions. Replacing spoiled or inedible food items can be expensive and inconvenient.

Accordingly, a method for limiting or preventing negative effects of an electricity interruption on a user of an appliance, such as a refrigerator appliance, would be useful. In particular, a method for assisting with limiting or preventing spoiling of food items within a refrigerator appliance during an electricity interruption would be useful.

BRIEF DESCRIPTION OF THE INVENTION

The present subject matter provides a method for operating an appliance, such as a refrigerator appliance. The method includes establishing a location of the appliance, obtaining weather information associated with the location of the appliance, scheduling a predicted power loss event for the appliance based at least in part on the weather information from the step of receiving, and operating the appliance according to a power loss operating profile before or during the predicted power loss event. A related refrigerator appliance is also provided. Additional aspects and advantages of the invention will be set forth in part in the following description, or may be apparent from the description, or may be learned through practice of the invention.

In a first exemplary embodiment, a method for operating an appliance is provided. The method includes establishing a location of the appliance, obtaining weather information associated with the location of the appliance, scheduling a predicted power loss event for the appliance based at least in part on the weather information from the step of receiving, and operating the appliance according to a power loss operating profile before or during the predicted power loss event.

In a second exemplary embodiment, a refrigerator appliance is provided. The refrigerator appliance includes a cabinet defining a chilled chamber and a sealed system configured for chilling air within the chilled chamber of the cabinet. A controller is in operative communication with the sealed system. The controller is configured for establishing a location of the refrigerator appliance, obtaining weather information associated with the location of the refrigerator appliance, scheduling a predicted power loss event for the refrigerator appliance based at least in part on the weather information from the step of receiving, and operating the sealed system according to a power loss operating profile before or during the predicted power loss event.

In a third exemplary embodiment, a method for operating an appliance is provided. The method includes establishing a location of the appliance, obtaining brownout or blackout information associated with the location of the appliance, scheduling a predicted power loss event for the appliance based at least in part on the brownout or blackout information from the step of receiving, and operating the appliance according to a power loss operating profile before or during the predicted power loss event.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
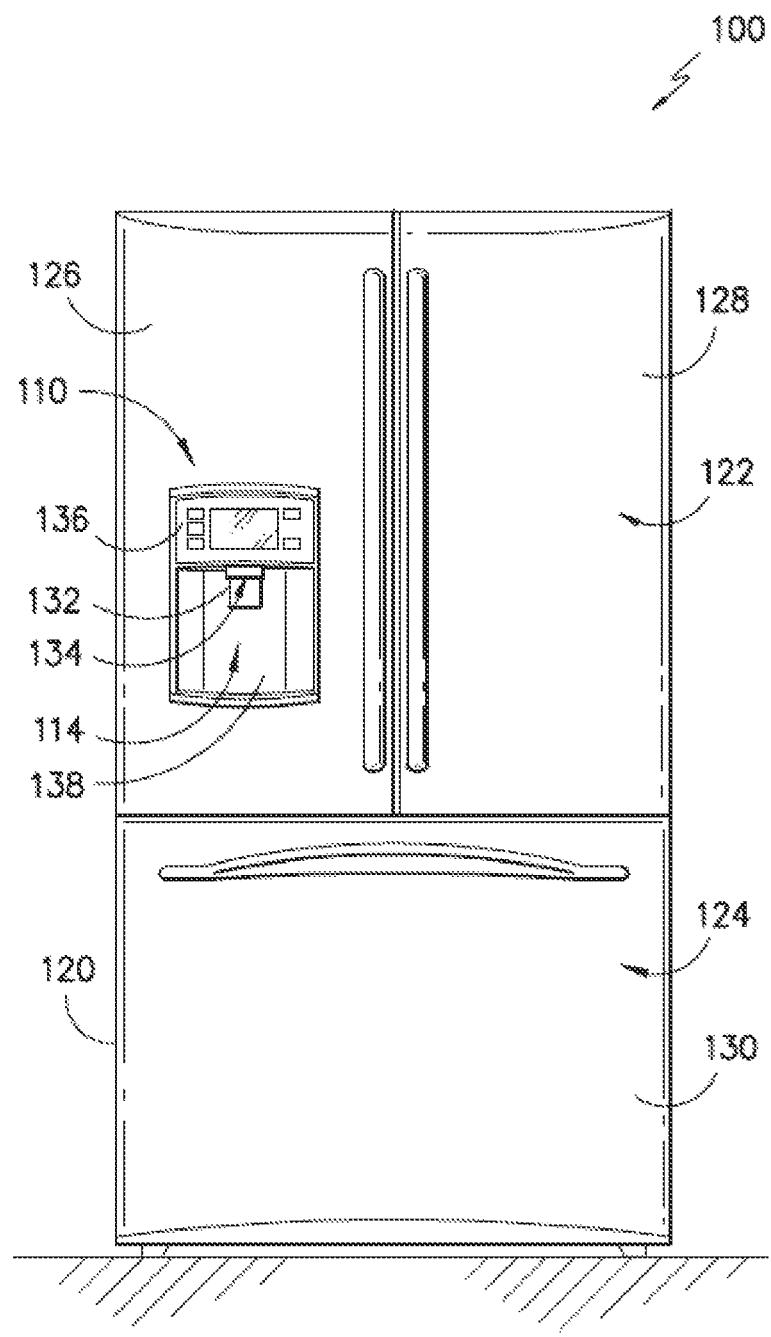
FIG. 1 provides a front, elevation view of a refrigerator appliance according to an exemplary embodiment of the present subject matter FIG. 2 provides a front, elevation view of the exemplary refrigerator appliance of FIG. 1 with doors of the exemplary refrigerator appliance shown in an open position.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
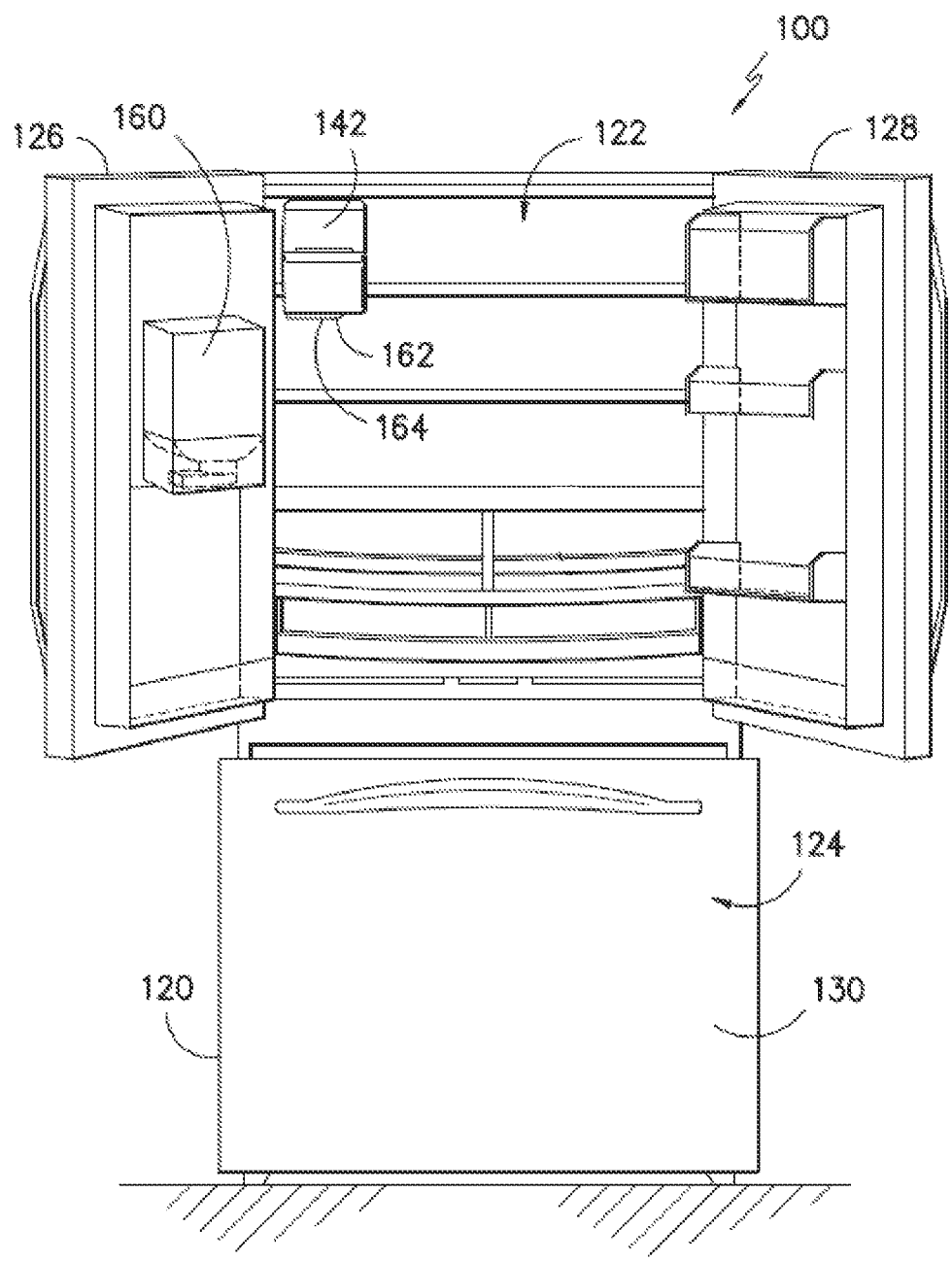

FIG. 1 provides a front, elevation view of a refrigerator appliance 100 according to an exemplary embodiment of the present subject matter. FIG. 2 provides a front, elevation view of refrigerator appliance 100 with refrigerator doors 126 and 128 of refrigerator appliance 100 shown in an open position to reveal a fresh food chamber 122 of refrigerator appliance 100. Refrigerator appliance 100 includes a cabinet or housing 120 that defines chilled chambers for receipt of food items for storage. In particular, refrigerator appliance 100 defines fresh food chamber 122 at an upper portion of refrigerator appliance 100 and a freezer chamber 124 arranged below fresh food chamber 122, e.g., at a lower portion of refrigerator appliance 100. As such, refrigerator appliance 100 is generally referred to as a bottom mount refrigerator appliance. However, using the teachings disclosed herein, one of skill in the art will understand that the present subject matter may be used with other types of refrigerator appliances (e.g., side-by-side style or top mount style) or a freezer appliance as well. Consequently, the description set forth herein is for illustrative purposes only and is not intended to limit the present subject matter to any particular chilled chamber arrangement or configuration.

Refrigerator doors 126 and 128 are rotatably hinged to an edge of housing 120 for accessing fresh food chamber 122. In particular, refrigerator doors 126 and 128 are rotatably mounted to housing 120 at an opening 121 that permits access to fresh food chamber 122. A freezer door 130 is arranged below refrigerator doors 126 and 128 for accessing freezer chamber 124. Freezer door 130 is coupled to a freezer drawer (not shown) slidably mounted within freezer chamber 124.

Refrigerator appliance 100 also includes a dispensing assembly 110 for dispensing liquid water and/or ice. Dispensing assembly 110 includes a dispenser 114 positioned on or mounted to an exterior portion of refrigerator appliance 100, e.g., on refrigerator door 126. Dispenser 114 includes a discharging outlet 134 for accessing ice and liquid water. An actuating mechanism 132, shown as a paddle, is mounted below discharging outlet 134 for operating dispenser 114. In alternative exemplary embodiments, any suitable actuating mechanism may be used to operate dispenser 114. For example, dispenser 114 can include a sensor (such as an ultrasonic sensor) or a button rather than the paddle. A user interface panel 136 is provided for controlling the mode of operation. For example, user interface panel 136 may include user inputs 176 (shown schematically in FIG. 3), such as a water dispensing button (not labeled) and an ice-dispensing button (not labeled), for selecting a desired mode of operation such as crushed or non-crushed ice. User interface panel 136 may also include a display 178 (shown schematically in FIG. 3), such as an LCD screen, for presenting information to the user of refrigerator appliance 100 visually.

Discharging outlet 134 and actuating mechanism 132 are an external part of dispenser 114 and are mounted in a dispenser recess 138. Dispenser recess 138 is positioned at a predetermined elevation convenient for a user to access ice or water and enabling the user to access ice without the need to bend-over and without the need to access freezer chamber 124. In the exemplary embodiment, dispenser recess 138 is positioned at a level that approximates the chest level of a user.

Turning now to FIG. 2, certain components of dispensing assembly 110 are illustrated. Dispensing assembly 110 includes an insulated housing 142 mounted within fresh food chamber 122. Due to the insulation which encloses insulated housing 142, the temperature within insulated housing 142 may be maintained at levels different from the ambient temperature in the surrounding fresh food chamber 122.

Insulated housing 142 is constructed and arranged to operate at a temperature that facilitates producing and storing ice. More particularly, insulated housing 142 contains an ice maker 180 (shown schematically in FIG. 3) for creating ice and feeding the same to an ice bucket 160 that is mounted on refrigerator door 126. As illustrated in FIG. 2, ice bucket 160 is placed at a vertical position on refrigerator door 126 that will allow for the receipt of ice from a discharge opening 162 located along a bottom edge 164 of insulated housing 142. As refrigerator door 126 is closed or opened, ice bucket 160 is moved in and out of position under insulated housing 142. In alternative exemplary embodiments, insulated housing 142 and the ice maker 180 located therein may be mounted at any other suitable location in refrigerator appliance 100, such as on refrigerator door 126.

Figure 3:
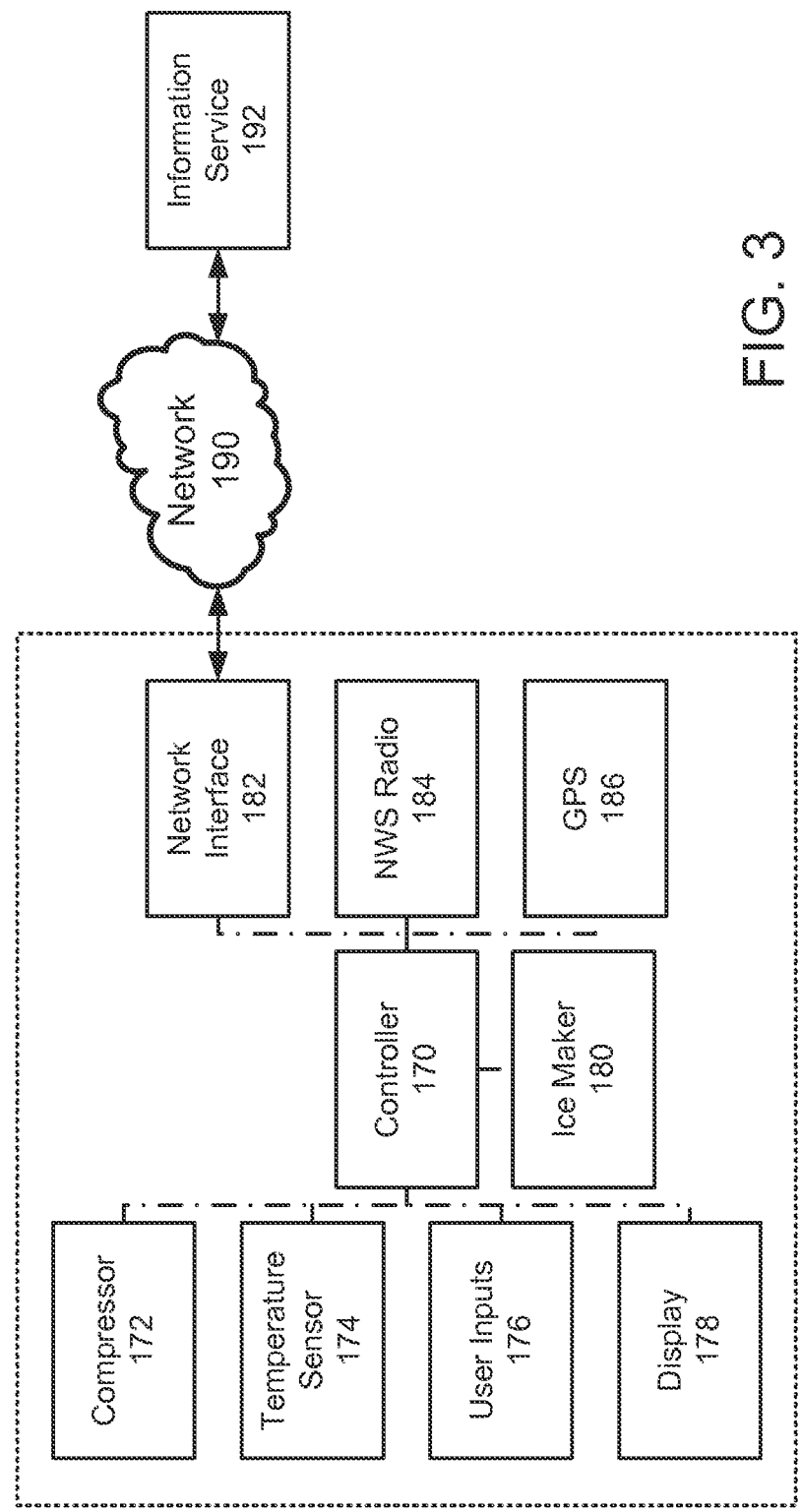
FIG. 3 provides a schematic view of certain components of the exemplary refrigerator appliance of FIG. 1.

FIG. 3 provides a schematic view of certain components of refrigerator appliance 100. As may be seen in FIG. 3, refrigerator appliance 100 includes a compressor 172. Compressor 172 is a component of a sealed system within refrigerator appliance 100. Sealed system 200 contains components for executing a vapor compression cycle for cooling air and/or liquid. The components include compressor 172, a condenser, a capillary tube and/or an evaporator connected in series and charged with a refrigerant.

Within the sealed system, gaseous refrigerant flows into compressor 172, which operates to increase the pressure of the refrigerant. This compression of the refrigerant raises its temperature, which is lowered by passing the gaseous refrigerant through the condenser. Within the condenser, heat exchange with ambient air takes place so as to cool the refrigerant and cause the refrigerant to condense to a liquid state. The capillary tube receives liquid refrigerant from the condenser. From the capillary tube, the liquid refrigerant enters the evaporator, e.g., positioned at or adjacent fresh food chamber 122 or freezer chamber 124. Upon exiting the capillary tube and entering the evaporator, the liquid refrigerant drops in pressure and, e.g., at least partially, vaporizes. Due to the pressure drop and phase change of the refrigerant, the evaporator is cool relative to fresh food and freezer chambers 122 and 124 of refrigerator appliance 100. As such, cooled air is produced and refrigerates fresh food and/or freezer chamber 122 and 124 of refrigerator appliance 100. Thus, the evaporator is a type of heat exchanger which transfers heat from air passing over the evaporator to refrigerant flowing through the evaporator. As will be understood by those skilled in the art, the sealed system may include additional components, e.g., at least one additional evaporator, compressor, expansion device, and/or condenser.

As may be seen in FIG. 3, refrigerator appliance 100 further includes a controller 170. Operation of the refrigerator appliance 100 is regulated by controller 170. Thus, various components of refrigerator appliance 100 are operatively coupled to or in communication with controller 170. For example, controller 170 is operatively coupled to or in communication with user input panel 136. In one exemplary embodiment, user interface panel 136 may represent a general purpose I/O ("GPIO") device or functional block. As discussed in greater detail below, user interface panel 136 includes user inputs 176, such as one or more of a variety of electrical, mechanical or electro-mechanical input devices including rotary dials, push buttons, and touch pads. User interface panel 136 may be in communication with controller 170 via one or more signal lines or shared communication busses.

User interface panel 136 provides selections for user manipulation of the operation of refrigerator appliance 100. In response to user manipulation of the user interface panel 136, controller 170 operates various components of refrigerator appliance 100. For example, controller 170 is operatively coupled or in communication with compressor 172 in order to selectively operate the sealed system and cool fresh food chamber 122 and/or freezer chamber 124.

Controller 170 includes memory and one or more processing devices such as microprocessors, CPUs or the like, such as general or special purpose microprocessors operable to execute programming instructions or micro-control code associated with operation of refrigerator appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 170 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Refrigerator appliance 100 also includes a temperature sensor 174. Temperature sensor 174 is configured for measuring a temperature of fresh food chamber 122 or freezer chamber 124. Temperature sensor 174 can be any suitable device for measuring the temperature of fresh food chamber 122 or freezer chamber 124. For example, temperature sensor 174 may be a thermistor or a thermocouple. Controller 170 can receive a signal, such as a voltage or a current, from temperature sensor 174 that corresponds to the temperature of the temperature of fresh food chamber 122 or freezer chamber 124. In such a manner, the temperature of fresh food chamber 122 or freezer chamber 124 may be monitored and/or recorded with controller 170.

Refrigerator appliance 100 also includes a network interface 182. Network interface 182 is configured for establishing communication with an information service 192 via a network 190. Network interface 182 of refrigerator appliance 100 may include any suitable components for interfacing with one more networks, such as network 190. For example, network interface 182 of refrigerator appliance 100 may include transmitters, receivers, ports, controllers, antennas, or other suitable components.

The network 190 may be any type of communications network, such as a local area network (e.g. intranet), wide area network (e.g. Internet), or some combination thereof. The network 190 can also include a direct connection between refrigerator appliance 100 and information service 192. In general, communication between refrigerator appliance 100 and information service 192 may be carried via network interface 182 using any type of wired and/or wireless connection, using a variety of communication protocols (e.g. TCP/IP, HTTP), encodings or formats (e.g. HTML, XML), and/or protection schemes (e.g. VPN, secure HTTP, SSL). In certain exemplary embodiments, network 190 may be a cellular network, and network interface 182 may include a cellular phone.

Refrigerator appliance 100 also includes a National Weather Service (NWS) radio 184. NWS radio 184 is configured for receiving radio transmissions from the NWS, e.g., on a frequency between about 162.400 MHz and about 162.550 MHz. Controller 170 may be in communication with NWS radio 184. Thus, NWS radio 184 may signal controller 170 when receiving weather alerts from the NWS.

Refrigerator appliance 100 also includes a global positioning system (GPS) receiver 186. GPS receiver 186 is configured for receiving transmissions from GPS satellites. As will be understood by those skilled in the art, GPS receiver 186 can establish or determine a location of GPS receiver 186 and/or refrigerator appliance 100 using such transmissions. GPS receiver 186 is in communication with controller 170, e.g., such that GPS receiver 186 may signal the location of GPS receiver 186 and/or refrigerator appliance 100 to controller 170.

As will be understood by those skilled in the art, various components of refrigerator appliance 100 require electricity to operate. For example, controller 170, compressor 172, ice maker 180, etc. can require electricity to operate. Thus, components of refrigerator appliance 100 can be inoperable when an electricity supply to refrigerator appliance 100 is interrupted, such as during poor weather, a blackout, a brownout, etc. In particular, the sealed system of refrigerator appliance 100 may be inoperable when an electricity supply to refrigerator appliance 100 is interrupted such that fresh food chamber 122 and/or freezer chamber 124 are not cooled by the sealed system. As discussed in greater detail below, controller 170 may be programmed or configured for operating refrigerator appliance 100 such that negative effects of deactivation of the sealed system, e.g., during severe weather, blackouts, brownouts, etc., are mitigated or avoided.

Figure 4:
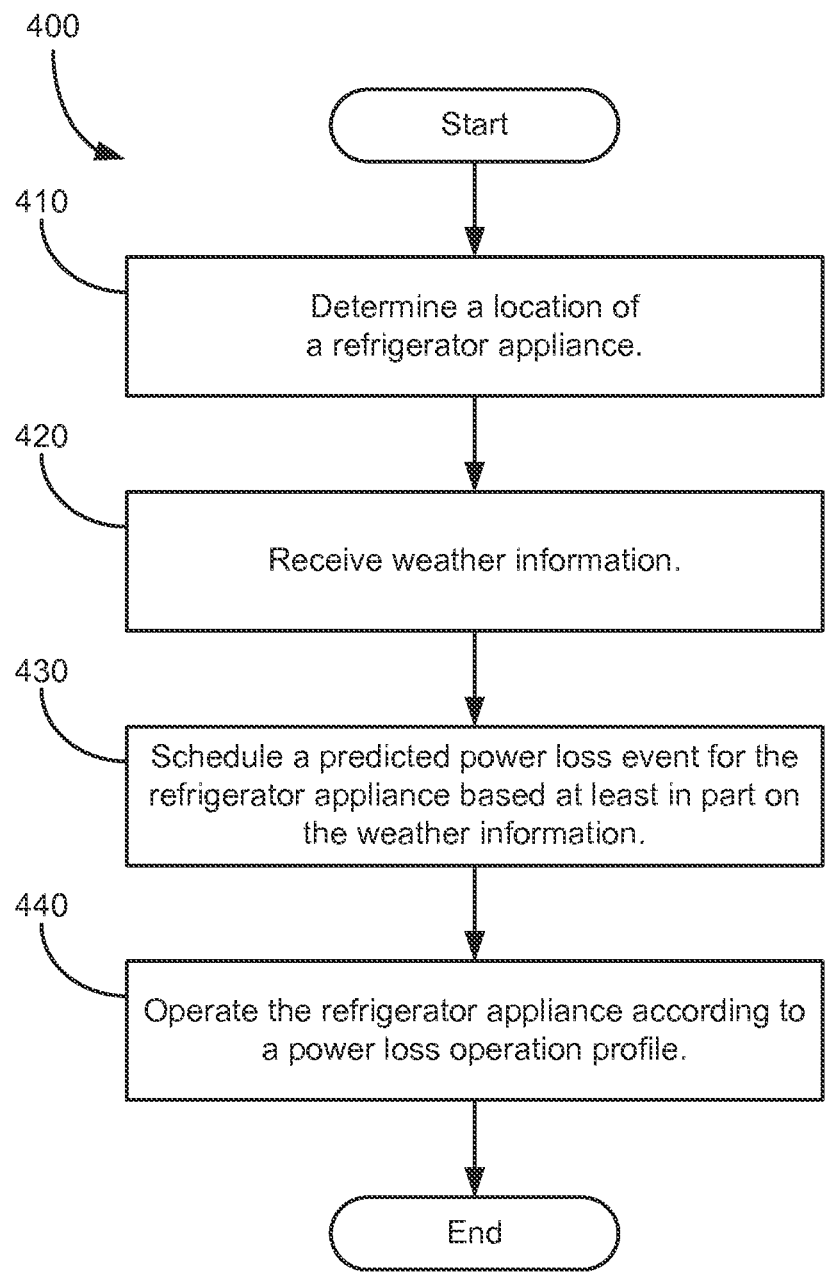
FIG. 4 illustrates a method for operating an appliance according to an exemplary embodiment of the present subject matter.

FIG. 4 illustrates a method 400 for operating an appliance according to an exemplary embodiment of the present subject matter. As discussed in greater detail below, method 400 may be used to operate refrigerator appliance 100. However, while described below in the context of refrigerator appliance 100, it should be understood that method 400 may be used to operate any suitable appliance. For example, method 400 may be used in or with a hot water heater appliance, an HVAC appliance or system, etc. Consequently, the description set forth herein is for illustrative purposes only and is not intended to limit the present subject matter to any particular appliance.

Utilizing method 400, weather data (or blackout or brownout data) is used to schedule or predict a power loss event for refrigerator appliance 100. As discussed above, the sealed system of refrigerator appliance 100 may be inoperative during the power loss event, e.g., such that fresh food chamber 122 and/or freezer chamber 124 are not cooled by the sealed system. Method 400 changes operating parameters of refrigerator appliance 100 and/or alerts a user of refrigerator appliance 100 prior to and/or during the predicted power loss event in order to mitigate or avoid the negative effects of actual power loss events.

At step 410, the location of refrigerator appliance 100 is established. The location of refrigerator appliance 100 can be established using any suitable method or mechanism at step 410. As an example, controller 170 may operate the GPS receiver 186 at step 410 to establish the location of refrigerator appliance 100 with GPS receiver 186. As another example, controller 170 may attain the location of refrigerator appliance 100 at step 100 based at least in part on cellular transmissions to or from refrigerator appliance 100. In particular, the location of refrigerator appliance 100 may be triangulated or otherwise determined based at least in part on cellular transmissions to or from network interface 182 (e.g., when network interface 182 includes a cellular phone transmitter and/or receiver). As yet another example, controller 170 can determine the location of refrigerator appliance 100 based at least in part on an Internet Protocol (IP) address of refrigerator appliance 100. In particular, information service 192 may be an IP locating service, such as wigle.net or skyhookwireless.com, etc., and controller 170 can receive the location of refrigerator appliance 100 from information service 192 via network 190. As a further example, a user of refrigerator appliance 100 can manually input the location of refrigerator appliance 100, e.g., with user inputs 176 and/or display 178 of refrigerator appliance 100.

At step 420, weather information (or blackout or brownout information) associated with the location of refrigerator appliance 100 is obtained. The weather information can be obtained using any suitable method or mechanism at step 420. As an example, controller 170 can monitor NWS radio 184 of refrigerator appliance 100. When NWS radio 184 receives a radio message from the NWS, controller 170 can receive the weather information from NWS radio 184. As another example, an email with the weather information can be received at the refrigerator appliance 100 at step 420. As yet another example, a text message, such as a Short Messaging Service (SMS) text message, with the weather information may be received at the refrigerator appliance 100 at step 420. As a further example, controller 170 can monitor or poll the information service 192 via network 190 in order to obtain the weather information at step 420. The information service 192 can correspond to a website, such as weather.com, accuweather.com, noaa.gov, etc., in such exemplary embodiments. Thus, controller 170 can receive the weather information via a web service response at network interface 182 of refrigerator appliance 100.

At step 430, a predicted power loss event for refrigerator appliance 100 is scheduled or predicted, e.g., based at least in part on the weather information from step 420. If the weather information from step 420 includes a poor or severe weather forecast or prediction, the supply of electricity to refrigerator appliance 100 from an electric grid may be disrupted or temporarily terminated due to severe weather.

As an example, the weather information from step 420 can include a start time and an end time for severe weather. In addition, the weather information from step 420 can also include a severe weather probability and/or a severe weather type, e.g., wind, hail, thunderstorm, etc. Controller 170 can calculate a score from the weather information (e.g., with factors such as the severe weather probability and severe weather type). If the score exceeds a threshold value, controller 170 can schedule the predicted power loss event for refrigerator appliance 100. Thus, the predicted power loss event for refrigerator appliance 100 may correspond to an event or period during which the weather information from step 420 indicates that a probability of losing or interrupting the supply of electricity to refrigerator appliance 100 is high enough that ameliorative or mitigating actions may be taken to avoid or prevent negative effects of losing the supply of electricity to refrigerator appliance 100.

At step 440, refrigerator appliance 100 is operated according to a power loss operating profile before or during the predicted power loss event. It should be understood that the phrase "before or during the predicted power loss event" is used non-exclusively herein. Thus, refrigerator appliance 100 may be operated according to the power loss operating profile before, during, or both before and during the predicted power loss event at step 440.

The power loss operating profile can assist with limiting or reducing the negative effects of losing the supply of electricity to refrigerator appliance 100. For example, the power loss operating profile can include reducing a temperature set point of refrigerator appliance 100, e.g., to a minimum acceptable or suitable temperature set point. By reducing the temperature set point, the sealed system of refrigerator appliance 100 can reduce the temperature of fresh food chamber 122 and/or freezer chamber 124. Thus, food items within fresh food chamber 122 and/or freezer chamber 124 can be colder if and/or when the supply of electricity to refrigerator appliance 100 is terminated or disrupted. In such a manner, the food items have a greater chance of being stored at suitable temperatures during the power outage.

In addition, controller 170 can also deactivate ice maker 180 before or during the predicted power loss event at step 440. By deactivating ice maker 180, less ice may be stored within ice bucket 160 during the power outage. As will be understood by those skilled in the art, ice within the ice bucket 160 can melt during the power outage. Thus, by reducing the volume of ice within the ice bucket 160, a volume of liquid water produced by melting ice can be reduced.

Further, controller 170 can also disable defrost operations of the refrigerator appliance 100 at step 440. Defrosting the evaporator of the sealed system, e.g., using a heating element and/or deactivating compressor 172, can cause the temperature of the fresh food chamber 122 and/or the freezer chamber 124 to increase. Thus, increases to the temperature of fresh food chamber 122 and/or freezer chamber 124 prior to the power outage may be limited or prevented by disabling defrost operations.

Controller 170 can also notify a user of refrigerator appliance 100 of the predicted power loss event at step 440. For example, an email or text may be sent to the user of refrigerator appliance 100, e.g., from controller 170 via network interface 182. As another example, an alarm, such as a siren or flashing light, may be activated to notify the user of the predicted power loss event. As a further example, controller 170 may present a message informing the user of the predicted power loss event on display 178. In the message, the user of refrigerator appliance 100 may also be requested to remove ice cubes from ice bucket 160.

Method 400 may also include steps for determining whether food items within fresh food chamber 122 and/or freezer chamber 124 have been improperly stored during an actual power loss event (e.g., an event where the supply of electricity to refrigerator appliance 100 was interrupted or terminated). For example, controller 170 measures the temperature of fresh food chamber 122 and/or freezer chamber 124 prior to the actual power loss event, e.g., with temperature sensor 174. Controller 170 also determines an elapsed time of the actual power loss event. After the actual power loss event, controller 170 gauges the temperature of fresh food chamber 122 and/or freezer chamber 124, e.g., with temperature sensor 174. Controller 170 alerts or notifies the user of refrigerator appliance 100 if food items within fresh food chamber 122 and/or freezer chamber 124 were stored within a food safety danger zone, e.g., as defined by the U.S. Food Safety and Inspection Service, during the actual power loss event. For example, perishable food items (such as meat, poultry, fish, eggs, etc.) that have been stored at a temperature at or above forty degrees Fahrenheit for more than about two hours may be potentially dangerous and should be disposed of rather than consumed.

It should be understood that certain steps of method 400 may be implemented remotely, such as step 410, step 420 and/or step 430. For example, certain steps of method 400 may be implemented on a remote cloud server. The remote cloud server may be polled by refrigerator appliance 100 in order to determine when to enter the power loss operating profile, or the remote cloud server may push a command to refrigerator appliance 100 to enter the power loss operating profile, e.g., before or during poor weather, a blackout, a brownout, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating an appliance, comprising:
    establishing a location of the appliance;
    obtaining weather information associated with the location of the appliance, wherein the weather information includes a start and end time, a probability, and a type of poor or severe weather for the location of the appliance;
    calculating a score from the weather information;
    scheduling a power loss event for the appliance in response to the score exceeding a threshold value; and
    operating the appliance according to a power loss operating profile before the scheduled power loss event.

2. The method of claim 1, wherein said step of establishing comprises at least one of:
    attaining the location of the appliance based at least in part on cellular transmissions from the appliance;
    operating a global positioning system (GPS) unit of the appliance;
    determining the location of the appliance based at least in part on an Internet Protocol (IP) address of the appliance; and
    inputting the location of the appliance on a user interface of the appliance.

3. The method of claim 1, wherein said step of obtaining comprises receiving a National Weather Service (NWS) radio message, an email or a Short Messaging Service (SMS) text message at the appliance.

4. The method of claim 1, wherein said step of obtaining comprises receiving the weather information via a web service response at the appliance.

5. The method of claim 1, wherein the appliance comprises a refrigerator appliance and said step of operating comprises reducing a temperature set point of refrigerator appliance before or during the scheduled power loss event.

6. The method of claim 5, further comprising inhibiting defrost operations of the refrigerator appliance before or during the scheduled power loss event.

7. The method of claim 5, further comprising notifying a user of the refrigerator appliance of the scheduled power loss event.

8. The method of claim 7, wherein said step of notifying comprises emailing or texting the user of the refrigerator appliance.

9. The method of claim 5, further comprising requesting a user of the refrigerator appliance to remove ice cubes from an ice bucket of the refrigerator appliance.

10. The method of claim 5, further comprising deactivating an ice maker of the refrigerator appliance before or during the scheduled power loss event.

11. The method of claim 5, further comprising:
    measuring a temperature of a chilled chamber of the refrigerator appliance prior to an actual power loss event;
    determining an elapsed time of the actual power loss event;
    gauging the temperature of the chilled chamber of the refrigerator appliance after the actual power loss event; and
    alerting a user of the refrigerator appliance if food items within the chilled chamber of the refrigerator appliance were stored within a food safety danger zone during the actual power loss event.

12. A refrigerator appliance, comprising:
    a cabinet defining a chilled chamber;
    a sealed system configured for chilling air within the chilled chamber of the cabinet:
    a controller in operative communication with the sealed system, the controller configured for
        establishing a location of the refrigerator appliance;
        obtaining weather information associated with the location of the refrigerator appliance, wherein the weather information includes a start and end time, a probability, and a type of poor or severe weather for the location of the refrigerator appliance;
        calculating a score from the weather information;
        scheduling a power loss event for the refrigerator appliance in response to the score exceeding a threshold value; and
        operating the sealed system according to a power loss operating profile before the scheduled power loss event.

13. The refrigerator appliance of claim 12, further comprising a global positioning system (GPS) unit, wherein the controller is configured for establishing the location of the refrigerator appliance by operating the GPS unit of the refrigerator appliance.

14. The refrigerator appliance of claim 12, further comprising a National Weather Service (NWS) radio receiver, wherein the controller is configured for obtaining the weather information by receiving an NWS radio message at the NWS radio receiver.

15. The refrigerator appliance of claim 12, wherein the controller is configured for reducing a temperature set point of the sealed system before or during the scheduled power loss event.

16. The refrigerator appliance of claim 12, wherein the controller is configured for inhibiting defrost operations of the sealed system before or during the scheduled power loss event.

17. The refrigerator appliance of claim 12, wherein the controller is further configured for notifying a user of the refrigerator appliance of the scheduled power loss event.

18. The refrigerator appliance of claim 12, further comprising an ice maker, the controller configured for deactivating the ice maker before or during the scheduled power loss event.

19. The refrigerator appliance of claim 12, further comprising a temperature sensor positioned for measuring a temperature of the chilled chamber of the cabinet, the controller further configured for
    measuring the temperature of the chilled chamber with the temperature sensor prior to an actual power loss event;
    determining an elapsed time of the actual power loss event;
    gauging the temperature of the chilled chamber with the temperature sensor after the actual power loss event; and
    alerting a user of the refrigerator appliance if food items within the chilled chamber were stored within a food safety danger zone during the actual power loss event.

20. A method for operating an appliance, comprising:
  establishing a location of the appliance;
  obtaining brownout or blackout information associated with the location of the appliance, wherein the brownout or blackout information includes a start and end time, a probability, and a type of poor or severe weather for the location of the appliance;
  calculating a score from the brownout or blackout information;
  scheduling a power loss event for the appliance in response to the score exceeding a threshold value; and
  operating the appliance according to a power loss operating profile before the scheduled power loss event.

* * * * *